UNITED STATES PATENT OFFICE.

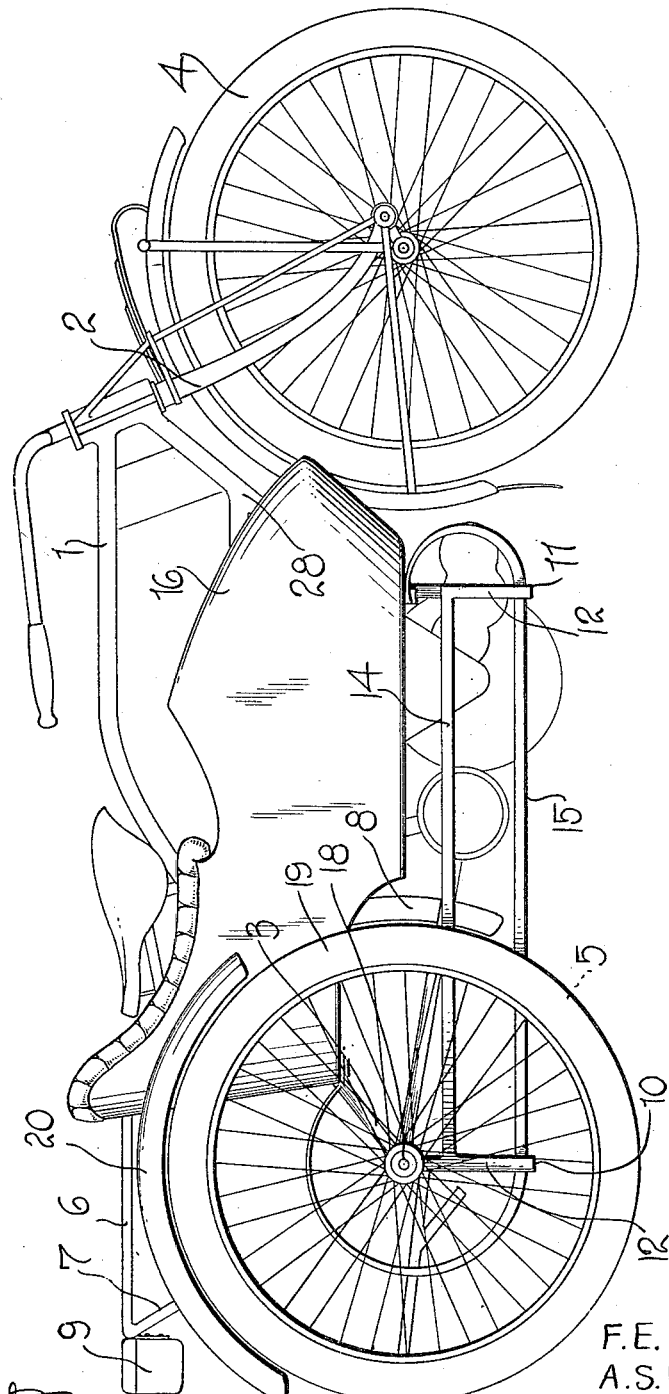

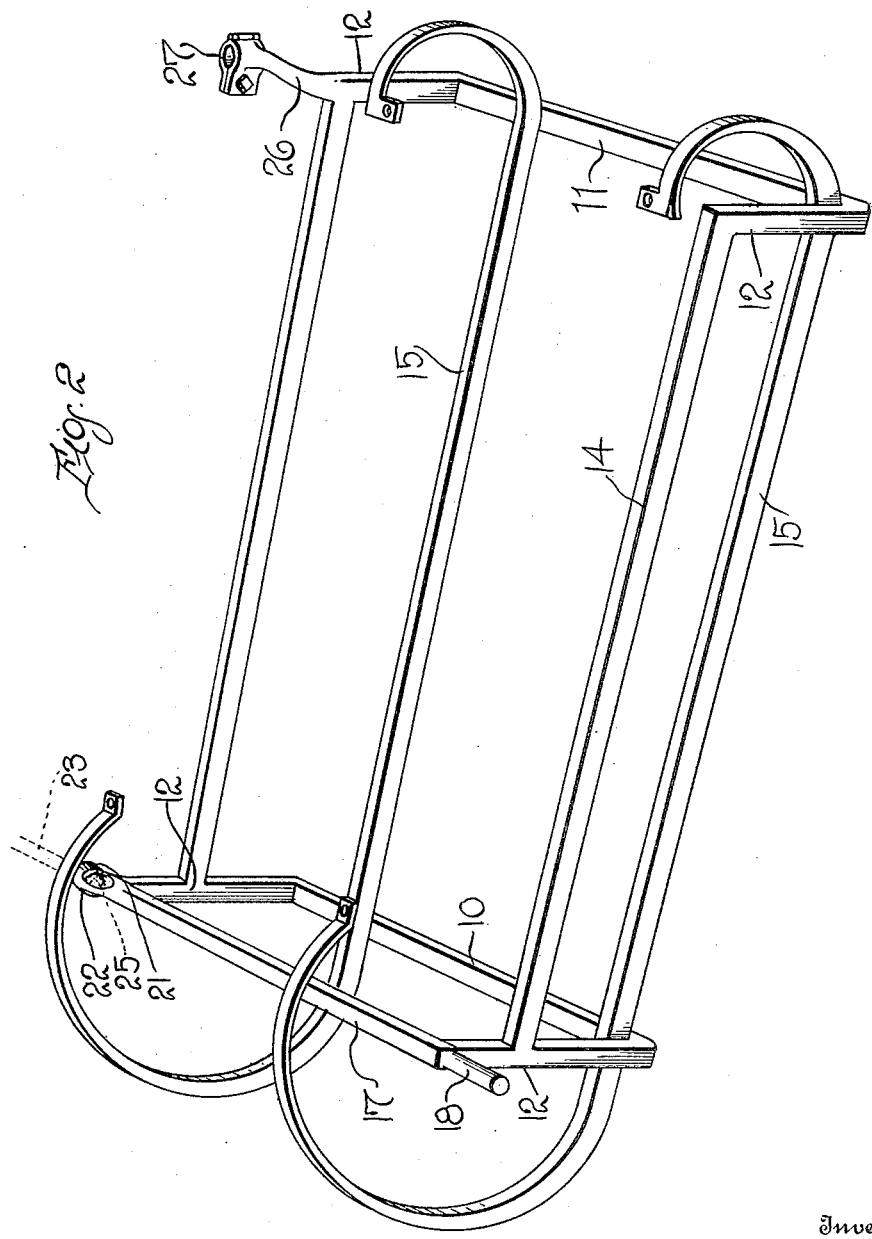

FELIX E. MESSIER AND ADDALORE S. MESSIER, OF SPRINGFIELD, MASSACHUSETTS.

VEHICLE.

1,133,444.  Specification of Letters Patent.  Patented Mar. 30, 1915.

Application filed August 1, 1914. Serial No. 854,537.

*To all whom it may concern:*

Be it known that we, FELIX E. MESSIER and ADDALORE S. MESSIER, citizens of the United States, residing at Springfield, in the county of Hampden and State of Massachusetts, have invented certain new and useful Improvements in Vehicles, of which the following is a specification, reference being had to the accompanying drawings.

This invention relates to vehicles and has relation more particularly to a device of this general character especially designed and adapted for use in connection with a cycle; and an object of the invention is to provide a device of this general character having novel and improved means whereby the same may be coupled to or disengaged from a cycle with convenience and facility.

Furthermore, it is an object of the invention to provide a device of this general character having novel and improved means whereby the device may be coupled with the cycle at two points and whereby the seat, included therein, is mounted in such a manner that a maximum load may be carried with minimum strain upon the vehicle and the cycle to which it is attached.

The invention consists in the details of construction and in the combination and arrangement of the several parts of our improved vehicle whereby certain important advantages are attained and the device is rendered simpler, less expensive and otherwise more convenient and advantageous for use, all as will be hereinafter more fully set forth.

The novel features of the invention will be carefully defined in the appended claims.

In order that our invention may be the better understood, we will now proceed to describe the same with reference to the accompanying drawings, wherein—

Figure 1 is an elevational view illustrating a vehicle constructed in accordance with an embodiment of our invention in applied position; and Fig. 2 is a view in perspective of our improved vehicle, detached, with the body omitted.

As disclosed in the accompanying drawings, 1 denotes the frame of a motor cycle having operatively engaged therewith the front fork 2 and the rear fork 3 whereby the steering wheel 4 and rear wheel 5 are operatively supported. As the motor cycle and its concomitant parts may be of any construction preferred, it is not believed necessary that a detailed description thereof be given, other than to state that we find it in practice of advantage to have rearwardly projecting from the rear fork 3 a luggage carrier 6 further supported by the brace 7 interposed between such luggage carrier 6 and the mud guard 8 for the rear wheel. Depending from the outer extremity of the luggage carrier 6 is the box 9 adapted to contain tools or the like.

As herein embodied, our improved vehicle or side car comprises the rear and forward transverse frame members 10 and 11 substantially U-shape in form, with the upper extremities of the stems 12 thereof tied or connected by the longitudinal side bars 14. The bases of the transverse members 10 and 11 serve as supports for the spring members 15 with which the body structure 16 is operatively engaged, as is believed to be clearly shown in the accompanying drawings.

The stems 12 of the transverse member 10 are connected by the cross bar 17 which projects beyond the outer side of the frame proper and such projected portion 18 serves as a supporting axle for the single wheel 19 of our improved vehicle or side car and the body 16 is provided with the mud guard 20 adapted to overlie the wheel 19 so that the occupant of the body is effectively protected, as is believed to be self-evident.

Projecting laterally from the inner stem of the transverse frame 10 is a bracket 21 terminating in a sleeve or barrel 22 adapted to surround the projected portion of the axle 23 of the wheel 5 and maintained in operative engagement therewith through the medium of the locking nut 25. The inner stem of the forward transverse frame 11 is provided with a bracket 26 disposed on a suitable curvature and having its free extremity provided with a clamping member 27 whereby the same may be effectively engaged with the forward brace 28 of the frame 1.

From the foregoing description, it is thought to be obvious that a vehicle constructed in accordance with our invention is of an extremely simple and comparatively inexpensive nature and is particularly well adapted for use by reason of the convenience and facility with which it may be assembled, and it will also be obvious that our invention is susceptible of some change and modification without material departure from the principles and spirit thereof and for this reason we do not wish to be understood as limiting ourselves to the precise arrangement and formation of the several parts herein shown in carrying out our invention in practice.

We claim:

1. In combination with a cycle, a vehicle comprising spaced transverse frames substantially U-shape in form, longitudinally disposed bars connecting the stems of said frames, a transverse bar connecting the stems of one of the transverse frames and projecting beyond one side thereof, the projected portion of the bar serving as a mounting for a wheel, a body, means coacting with the body and the transverse frames for supporting the body, and means carried by the inner stems of the transverse frames engageable with the cycle.

2. In combination with a cycle, a vehicle comprising spaced transverse frames substantially U-shape in form, longitudinally disposed bars connecting the stems of said frames, a transverse bar connecting the stems of one of the transverse frames and projecting beyond one side thereof, the projected portion of the bar serving as a mounting for a wheel, a body, means coacting with the body and the transverse frames for supporting the body, and brackets projecting laterally from the inner stems of the transverse frames, each of said brackets being provided with securing means.

In testimony whereof we hereunto affix our signatures in the presence of two witnesses.

FELIX E. MESSIER.
ADDALORE S. MESSIER.

Witnesses:
HENRY I. HERCHOVITZ,
JOHN J. LANDERS.

Copies of this patent may be obtained for five cents each, by addressing the "Commissioner of Patents, Washington, D. C."